US008035779B2

(12) United States Patent
Baek et al.

(10) Patent No.: US 8,035,779 B2
(45) Date of Patent: Oct. 11, 2011

(54) THIN FILM TRANSISTOR DISPLAY PANEL, LIQUID CRYSTAL DISPLAY HAVING THE SAME, AND METHOD OF MANUFACTURING LIQUID CRYSTAL DISPLAY

(75) Inventors: Seung-Soo Baek, Seoul (KR);
Seong-Young Lee, Anyang-si (KR);
Dong-Gyu Kim, Yongin-si (KR);
Jang-Soo Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 370 days.

(21) Appl. No.: 12/421,115

(22) Filed: Apr. 9, 2009

(65) Prior Publication Data
US 2010/0033646 A1   Feb. 11, 2010

(30) Foreign Application Priority Data
Aug. 11, 2008 (KR) .................. 10-2008-0078347

(51) Int. Cl.
*G02F 1/1333* (2006.01)
(52) U.S. Cl. ....................................... 349/110; 349/156
(58) Field of Classification Search .................. None
See application file for complete search history.

(56) References Cited

U.S. PATENT DOCUMENTS
2007/0002264 A1*   1/2007   Kim ........................... 349/156
2008/0007687 A1*   1/2008   Konno ....................... 349/156
* cited by examiner

*Primary Examiner* — Hemang Sanghavi
(74) *Attorney, Agent, or Firm* — Cantor Colburn LLP

(57) ABSTRACT

A thin film transistor ("TFT") array panel includes; a substrate including a display and peripheral area, a display area signal line and a display area TFT disposed in the display area, the display area TFT connected to the display area signal line, a plurality of peripheral area signal lines, a light blocking member disposed on the display area signal line, the display area TFT, and the peripheral area signal lines, a transparent connector connecting one of peripheral area signal lines and another one of the peripheral area signal lines through a contact hole passing through the light blocking member, a pixel electrode connected to the display area TFT, a spacer disposed on a layer above the light blocking member, and a light blocking assistance member composed of the same material as the spacer on the transparent connector, the light blocking assistance member covering at least the contact hole.

31 Claims, 10 Drawing Sheets

US 8,035,779 B2

THIN FILM TRANSISTOR DISPLAY PANEL, LIQUID CRYSTAL DISPLAY HAVING THE SAME, AND METHOD OF MANUFACTURING LIQUID CRYSTAL DISPLAY

This application claims priority to Korean Patent Application No. 10-2008-0078347, filed on Aug. 11, 2008, and all the benefits accruing therefrom under 35 U.S.C. §119, the contents of which in its entirety are herein incorporated by reference.

BACKGROUND OF THE INVENTION (a) Technical Field

The present invention relates to a thin film transistor array panel, a liquid crystal display including the same, and a method for manufacturing a liquid crystal display.

(b) Discussion

A liquid crystal display ("LCD") is one type of flat panel display that is now widely used. The typical LCD includes two display panels, each having field generating electrodes such as pixel electrodes and a common electrode, and a liquid crystal layer interposed between the display panels. In the LCD, a voltage is applied to the field generating electrodes to generate an electric field in the liquid crystal layer, which determines the direction of liquid crystal molecules of the liquid crystal layer, and an image is displayed by controlling the polarization of incident light.

Among the various types of LCDs, a liquid crystal display including a light blocking member (a black matrix) formed in a thin film transistor array panel to improve the transmittance and to simplify the manufacturing process has been developed. However, the light blocking member does not cover contact holes disposed in a region outside the display area in this liquid crystal display such that the light reflected through the contact holes may deteriorate the display quality of the liquid crystal display.

BRIEF SUMMARY OF THE INVENTION

An exemplary embodiment of a TFT array panel according to the present invention includes; a substrate including a display area and a peripheral area, a display area signal line disposed in the display area of the substrate, a display area TFT disposed in the display area of the substrate and connected to the display area signal line, a plurality of peripheral area signal lines disposed in the peripheral area of the substrate, a light blocking member disposed on the display area signal line, the display area TFT, and the plurality of peripheral area signal lines, a transparent connector electrically connecting at least one of the plurality of peripheral area signal lines and another one of the plurality of peripheral area signal lines through at least one contact hole passing through the light blocking member, a pixel electrode connected to the display area TFT, a colored spacer disposed on the light blocking member, and a light blocking assistance member comprising the same material as the spacer on the transparent connector and covering at least the at least one contact hole.

In one exemplary embodiment, an assistance spacer may be formed in the peripheral area.

In one exemplary embodiment, an outer protruding member may be formed with the same material as the color filter between the substrate in the peripheral area and the light blocking member in the peripheral area.

In one exemplary embodiment, a color filter may be formed on the substrate.

In one exemplary embodiment, a peripheral area TFT formed in the peripheral area of the substrate may be further included, wherein the at least one contact hole may have a contact hole electrically connecting the peripheral area TFT and at least one of the plurality of peripheral area signal lines to each other.

In one exemplary embodiment, the plurality of peripheral area signal lines includes; a storage electrode line disposed on the substrate and a storage voltage supplying line disposed on the storage electrode line, wherein the at least one contact hole may have a contact hole connecting the storage electrode line and the storage voltage supplying line to each other.

In one exemplary embodiment, the plurality of peripheral area signal lines includes; a gate line layer signal line of the gate driver disposed on the substrate and a data line layer signal line of the gate driver, wherein the at least one contact hole may have a contact hole connecting the gate line layer signal line of the gate driver and the data line layer signal line of the gate driver.

An exemplary embodiment of a liquid crystal display ("LCD") according to the present invention includes; a first display panel including; a first substrate having a display area and a peripheral area, a plurality of peripheral area signal lines formed in the peripheral area of the first substrate, a light blocking member disposed on the plurality of peripheral area signal lines, a pixel electrode disposed on the light blocking member, a transparent connector electrically connecting at least one of the plurality of peripheral area signal lines and another one of the plurality of peripheral area signal lines through at least one contact hole passing through the light blocking member, a colored spacer disposed on the light blocking member a light blocking assistance member composed of substantially the same material as the spacer on the transparent connector, the light blocking assistance member comprising the same material as the spacer on the transparent connector, and the light blocking assistance member covering at least the at least one contact hole, a second display panel including; a second substrate facing the first substrate, and a common electrode disposed on the second substrate, and a liquid crystal layer disposed between the first display panel and the second display panel.

An exemplary embodiment of a manufacturing method of an LCD according to the present invention includes; forming a display area signal line and a plurality of peripheral area signal lines on a first substrate, forming a light blocking member on the plurality of peripheral area signal lines, forming a pixel electrode on the display area signal line, forming a transparent connector on the light blocking member connecting at least one of the plurality of peripheral area signal lines to another of the plurality of peripheral area signal lines through at least one contact hole passing through the light blocking member, and forming a colored spacer on the light blocking member and a colored light blocking assistance member on the transparent connector substantially simultaneously, wherein the light blocking assistance member covers at least the at least one contact hole and includes substantially the same material as the spacer.

In one exemplary embodiment, in the forming of the light blocking assistance member, an assistance spacer may be formed by using a half-tone mask.

In one exemplary embodiment, the method may further include forming a color filter between the display area signal line and the pixel electrode.

In one exemplary embodiment, in the forming of the color filter, an outer protruding member may be formed with the same material as the color filter.

In one exemplary embodiment, the method may further include forming a TFT connected to the display area signal line.

In one exemplary embodiment, the method may further include forming a liquid crystal layer on the light blocking assistance member, and combining a second substrate having a common electrode to the first substrate.

In an exemplary embodiment of the present invention, the contact hole of the peripheral area is covered by the colored light blocking assistance member such that reflection of external light is reduced and the display quality of the LCD is improved. Furthermore, in an exemplary embodiment of the present invention, the whole peripheral area is covered such the light blocking member prevents light leakage.

In an exemplary embodiment of the present invention, the difference of the thickness in the peripheral area is minimized using the light blocking member and the light blocking assistance member such that a sealant may be easily formed.

In an exemplary embodiment of the present invention, the light blocking member is formed on the TFT array panel such that the transmittance of the LCD may be improved and the manufacturing process may be simplified.

In an exemplary embodiment of the present invention, the color filter is formed on the TFT array panel such that the manufacturing process of the LCD may be simplified.

DETAILED DESCRIPTION OF THE INVENTION

Figure 1:
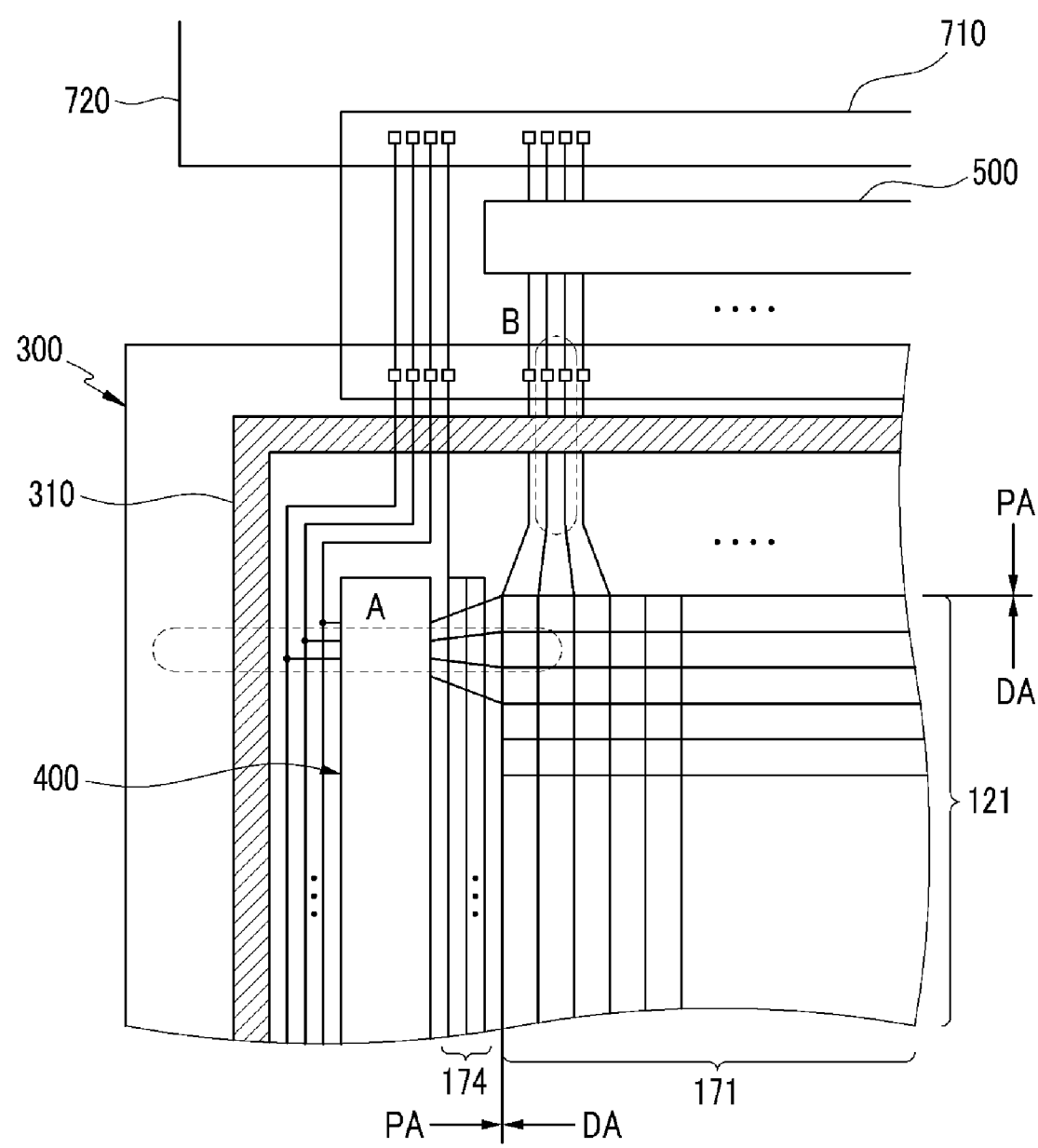
FIG. 1 is a top plan layout view of an exemplary embodiment of a liquid crystal display ("LCD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Now, an exemplary embodiment of a thin film transistor ("TFT") array panel and an exemplary embodiment of a liquid crystal display ("LCD") including the same according to the present invention will be described with reference to FIG. 1 to FIG. 5.

Figure 2:
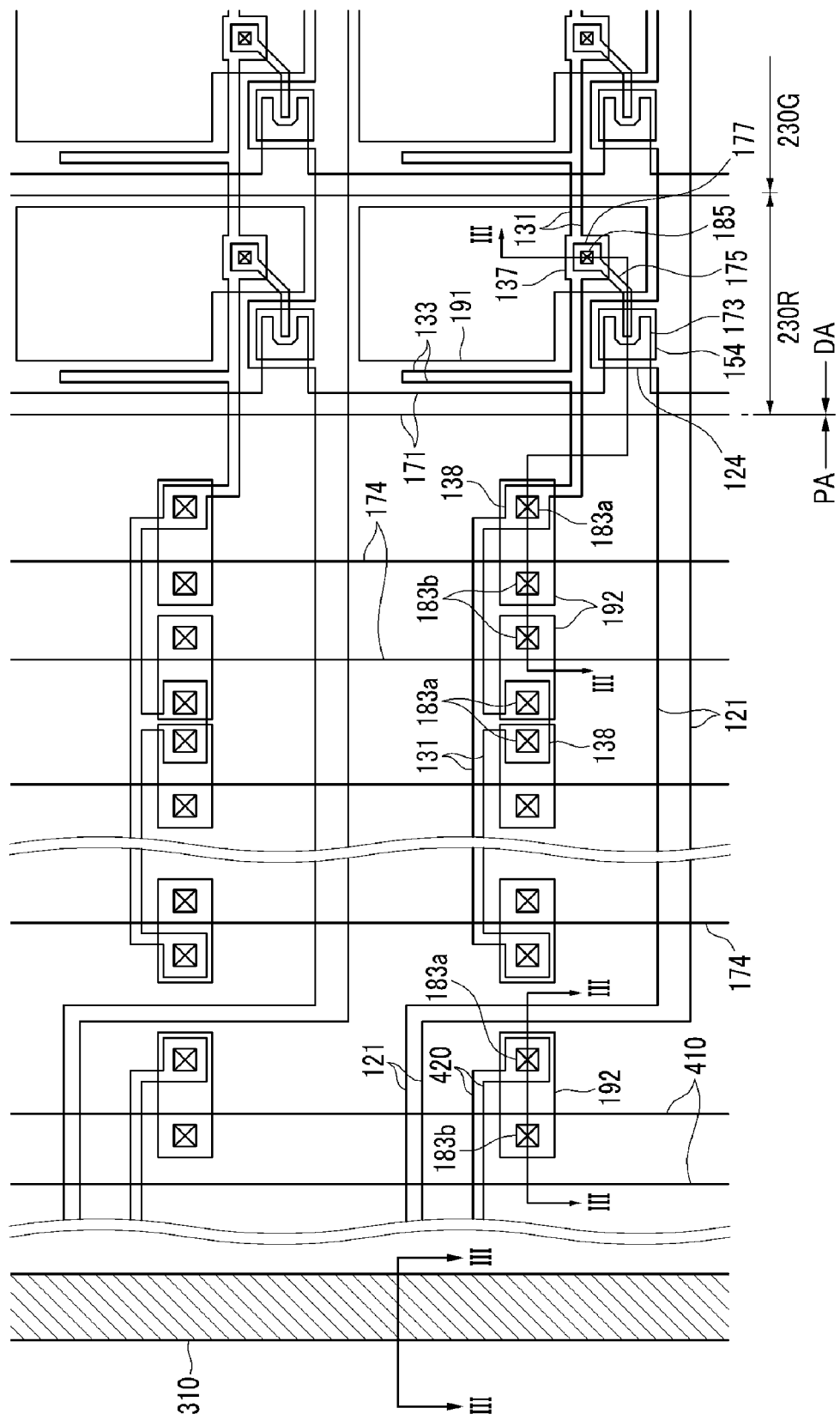
FIG. 2 is a top plan layout view of an A region shown in FIG. 1.
Figure 3A:
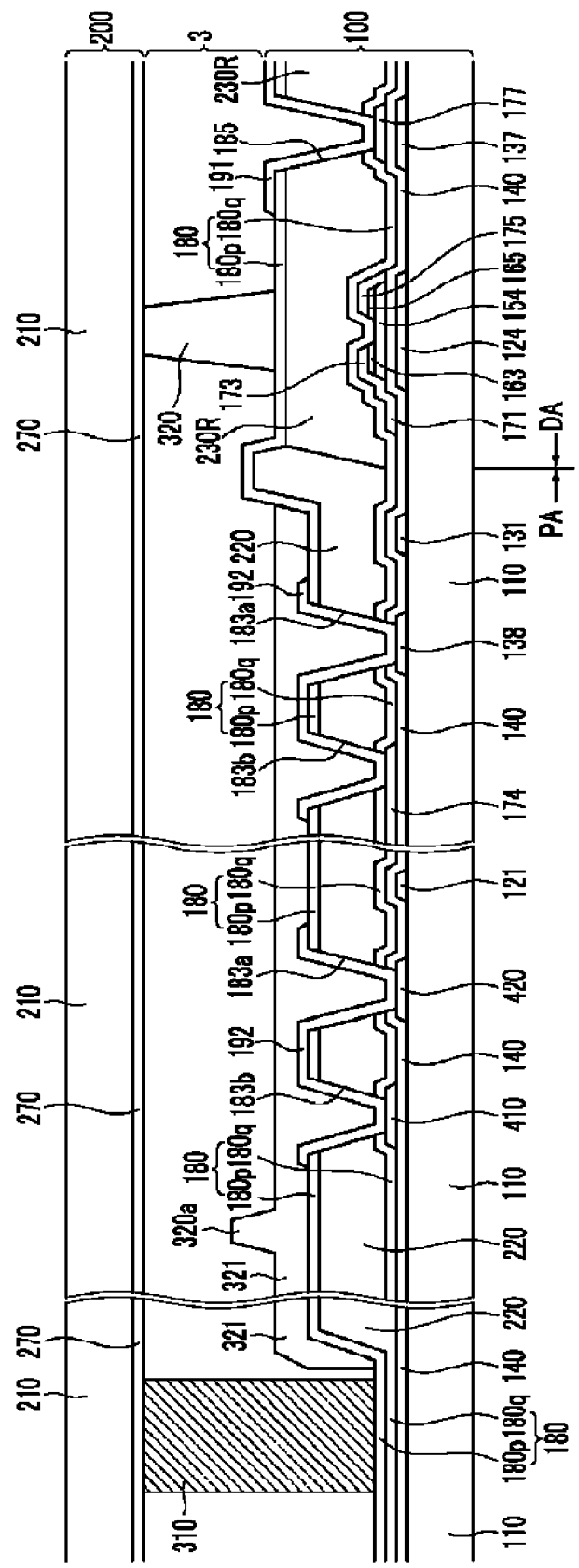
FIG. 3A to FIG. 3F are cross-sectional views illustrating various exemplary embodiments of the A region of the exemplary embodiment of an LCD according to the present invention taken along line III-III of FIG. 2.

FIG. 1 is a top play layout view of an exemplary embodiment of an LCD according to the present invention, FIG. 2 is a top plan layout view of an A region shown in FIG. 1, and FIG. 3A is a cross-sectional view showing the A region of the exemplary embodiment of an LCD according to the present invention taken along line III-III of FIG. 2.

An exemplary embodiment of an LCD according to the present invention includes a liquid crystal panel assembly 300, a flexible circuit board 710 connected thereto, and a driving circuit board 720 connected to the flexible circuit board 310. A gate driver 400 is formed on the liquid crystal panel assembly 300, and a data driver 500 is formed on the flexible circuit board 310. However, alternative exemplary embodiments include configurations wherein the gate driver 400 may not be formed on a first display panel 100 of the liquid crystal panel assembly 300, but may instead be formed on an additional printed circuit board ("PCB") and may be connected to the liquid crystal panel assembly 300. A storage voltage supplying line 174 is connected to the driving circuit board 720 through the flexible circuit board 710.

As shown in, and discussed in more detail with respect to, FIG. 3A, the liquid crystal panel assembly 300 includes a first display panel 100 and a second display panel 200, and a liquid crystal layer 3 interposed therebetween, and includes a plurality of gate lines 121 extending in a row direction, a plurality of data lines 171 extending in a column direction, and a plurality of pixels connected to the gate lines 121 and the data lines 171 and substantially arranged in a matrix shape. Also, in one exemplary embodiment, a sealant 310 may be formed in the peripheral area PA of the liquid crystal panel assembly 300, and the sealant 310 seals the liquid crystal molecules of the liquid crystal layer 3 therein.

The liquid crystal layer 3 may have positive or negative dielectric anisotropy, and the liquid crystal molecules of the liquid crystal layer 3 are aligned such that the long axis of the liquid crystal molecules may be arranged substantially parallel or substantially perpendicular to the surface of the display panels 100 and 200 when the electric field is not applied.

At least one alignment layer (not shown) may be formed on an inner surface of the display panels 100 and 200. In one exemplary embodiment, the alignment layer may be a horizontal alignment layer. A polarizer (not shown) may be provided on the outer surface of the display panels 100 and 200.

Firstly, the first display panel 100 will be described with respect to FIGS. 1-3A. The first display panel 100 may include a TFT formed on the inner surface of a first substrate 110.

A plurality of gate lines 121 and a plurality of storage electrode lines 131 are formed on the first insulating substrate 110, exemplary embodiments of which may be made of a material such as transparent glass or plastic, or other similar materials. The gate lines 121 transmit gate signals and extend in a substantially transverse direction. Each of the gate lines 121 includes a plurality of gate electrodes 124 protruding upward therefrom.

The storage electrode lines 131 receive a predetermined voltage and are substantially parallel to the gate lines 121. In the present exemplary embodiment, the storage electrode lines 131 are disposed adjacent to and slightly offset from the gate lines 121. The storage electrode lines 131 include a primary storage electrode 137 having an approximately square shape, and a secondary storage electrode 133. Alternative exemplary embodiments include configurations wherein the storage electrode lines 131 and the storage electrodes 133 and 137 may be variously changed.

A gate insulating layer 140, exemplary embodiments of which may be made of a material such as silicon nitride ("SiNx") or silicon dioxide ("SiOx"), or other materials with similar characteristics, is formed on the gate lines 121 and the storage electrode lines 131.

A plurality of semiconductor islands 154, exemplary embodiments of which may be made of a material such as hydrogenated amorphous silicon (simply referred to as a-Si) or a crystallized silicon, or other materials with similar characteristics, are formed on the gate insulating layer 140. The semiconductor islands 154 are respectively disposed on the gate electrodes 124.

A pair of ohmic contact islands 163 and 165 are formed on each of the semiconductor islands 154. Exemplary embodiments of the ohmic contacts 163 and 165 are made of a material such as n+ hydrogenated a-Si heavily doped with an N-type impurity such as phosphorous, or they may be made of a silicide, or other materials with similar characteristics.

A plurality of data lines 171 and a plurality of drain electrodes 175 are formed on the ohmic contacts 163 and 165 and the gate insulating layer 140. The data lines 171 transmit data voltages and extend in a substantially longitudinal direction, thereby being disposed substantially perpendicular to the gate lines 121. In the present exemplary embodiment, the data lines 171 are disposed substantially parallel to the second storage electrodes 133, and adjacent to the gate electrodes 124. Each of the data lines 171 includes a plurality of source electrodes 173, which in the present exemplary embodiment include a "U" shape having horizontally opposed bifurcated branches, disposed on the gate electrodes 124.

The drain electrodes 175 are separated from the data lines 171, and, in the present exemplary embodiment, include a narrow portion and a wide portion 177. In the present exemplary embodiment, the narrow portion includes an end portion enclosed by branches of the source electrode 173, and the wide portion 177 has an approximately square shape and overlaps the primary storage electrode 137. The wide portion 177 of the drain electrode 175 has substantially the same area as the primary storage electrode 137, however it may be bound by the overlapping surface area of the primary storage electrode 137.

An individual gate electrode 124, an individual source electrode 173, and an individual drain electrode 175, together with a semiconductor island 154, form an individual TFT. The channel of the TFT is formed in the semiconductor island 154 between the source electrode 173 and the drain electrode 175.

In the present exemplary embodiment, the ohmic contacts 163 and 165 are interposed only between the underlying semiconductor islands 154 and the overlying data lines 171 and the drain electrodes 175, and reduce contact resistance therebetween. The semiconductor islands 154 include exposed portions that are not covered by the source electrodes 173 and the drain electrodes 175, and portions that are disposed between the data lines 171 and the drain electrodes 175.

A passivation layer 180 is formed on the data lines 171, the drain electrodes 175, and the exposed semiconductor islands 154. In the present exemplary embodiment, the passivation layer 180 includes a lower layer 180q made of an inorganic insulator, exemplary embodiments of which include silicon nitride or silicon oxide, and an upper layer 180p. Exemplary embodiments include configurations wherein at least one of the lower layer 180q and the upper layer 180p may be omitted. The passivation layer 180 has a second contact hole 185 exposing the wide portion 177 of the drain electrode 175.

A light blocking member 220 is formed between the upper layer 180p and the lower layer 180q. The light blocking member 220 prevents light from being transmitted through the region where the liquid crystal molecules of the liquid crystal layer 3 are not controlled or the external light from being reflected. In the present exemplary embodiment, the light blocking member 220 is formed on the first display panel 100, not the second display panel 200, such that the transmittance of the LCD may be improved and the manufacturing process may be simplified.

A red color filter 230R, a green color filter 230G, and a blue color filter 230B (not shown) are formed between the upper layer 180p and the lower layer 180q. The color filters 230R, 230G and 230B each respectively occupy the region between neighboring data lines 171 where they are formed. The left and right boundaries of the red color filter 230R are disposed on the data lines 171, and may extend according to the data lines 171 in the longitudinal direction, and in one exemplary embodiment, the red color filter 230R may have a band shape. The red color filter 230R has the contact hole 185 disposed on the wide portion 177 of the drain electrode 175. Exemplary embodiments of the red color filter 230R may be made of a photosensitive organic material including pigments. However, alternative exemplary embodiments include configurations wherein the red color filter 230R may be formed on the second display panel 200 rather than the first display panel 100. The above description of the red color filter 230R may be similarly applied to the green color filter 230G and the blue color filter (not shown). Alternative exemplary embodiments also include configurations wherein the color filters 230R, 230G and 230B are not formed in a band shape, but are rather separately formed for each of the plurality of pixels.

A plurality of pixel electrodes 191 is formed on the upper layer 180p of the passivation layer 180. The pixel electrodes 191 may be made of a transparent conductive material, exemplary embodiments of which include indium tin oxide ("ITO") or indium zinc oxide ("IZO"), or a reflective metal, exemplary embodiments of which include aluminum, silver, chromium, or alloys thereof or other materials having similar characteristics.

The pixel electrodes 191 are connected to the drain electrodes 175 of the TFTs through the contact holes 185, and are applied with data voltages from the drain electrodes 175. The pixel electrodes 191 supplied with the data voltages generate an electric field along with a common electrode 270 of the second display panel 200, which determines the orientations of the liquid crystal molecules of the liquid crystal layer 3 disposed between the electrodes 191 and 270. Accordingly, the luminance of the light transmitted through the liquid crystal layer 3 differs depending on the determined orientation of the liquid crystal molecules. The pixel electrode 191 and the common electrode 270 form a liquid crystal capacitor and maintain the voltage applied to the pixel electrode after the TFT is turned off.

The pixel electrode 191 and the drain electrode 175 connected thereto, and the storage electrode line 131 including the primary storage electrode 137 and the second storage electrode 133, are overlapped with each other to thereby form a storage capacitor.

A spacer 320, exemplary embodiments of which may comprise a colored organic material, is disposed in the display area DA of the LCD. The color of the spacer 320 may be black, grey, red, green or blue, etc according to the location of the space on the display area DA. Also, in one exemplary embodiment the spacer 320 may have about 0.5 optical density ("OD") per micro meter or more. The spacer 320 maintains the interval of the liquid crystal layer 3 between the two display panels 100 and 200.

An assistance spacer 320a, exemplary embodiments of which include a colored organic material similar to the spacer 320, is disposed in the peripheral area PA of the LCD, and generally is formed as a protrusion on a light blocking assistance member 321 as will be described in more detail below. During a manufacturing process, the first substrate 110 and a second substrate 210 in the peripheral area PA may be bent and contacted to each by atmospheric pressure and may then subsequently be separated from each other after the passage of a predetermined time. Here, if the liquid crystal is injected when the first substrate 110 and the second substrate 210 are contacted to each other, when the first substrate 110 and the second substrate 210 are separated, the liquid crystal is moved to the side of the sealant 310 such that the thickness of the liquid crystal layer 3 may be changed. Accordingly, the assistance spacer 320a exists to prevent the contact and the separation of the peripheral area PA. However, exemplary embodiments include configurations wherein the assistance spacer 320a may be omitted.

When forming the color filter 230R on the first display panel 100, the color filter 230R may be disposed in the display area DA and the color filter 230R may not be disposed in the peripheral area PA to form a stepped structure. Accordingly, although the spacer 320 and the assistance spacer 320a have the same height, the height of the assistance spacer 320a may be lower than the spacer due to the stepped structure of the color filter 230R.

The display area DA of the LCD is a region where the images are actually output, and the peripheral area PA is formed with the various signal lines at an edge of the display area DA. The light blocking member 220 is disposed between the upper layer 180p and the lower layer 180q. However, as described above, alternative exemplary embodiments include configurations wherein the upper layer 180p may be omitted.

The storage electrode line 131 is extended substantially in the row direction on the left and right portions of the peripheral area PA of the LCD at substantially the same layer of the first display panel 100 as the gate line 121. The storage electrode line 131 includes an outer storage electrode 138. In the present exemplary embodiment, the outer storage electrode 138 has an approximately square or rectangular shape.

Several storage voltage supplying lines 174 extend substantially in the column direction on the left and right portions of the peripheral area PA of the LCD at substantially the same layer of the first display panel 100 as the data line 121.

A transparent connector 192 electrically connects the storage voltage supplying line 174 and the outer storage electrode 138. A contact hole 183b is formed on the connector portion between the transparent connector 192 and the storage voltage supplying line 174, and another contact hole 183a is formed on the connector portion between the transparent connector 192 and the outer storage electrode 138. However, exemplary embodiments include configurations wherein the outer storage electrode 138 and the storage voltage supplying line 174 may be omitted.

In the present exemplary embodiment, the gate driver 400 connected to the gate lines 121 is formed on the left and right portions of the peripheral area PA of the LCD. The gate driver 400 includes a data line layer signal line 410 and a gate line layer signal line 420, which are electrically connected through the transparent connector 192. The data line layer signal line 410 is formed from substantially the same layer as the data line 171, and the gate line layer signal line 420 is formed from substantially the same layer as the gate line 121. Here, the contact hole 183b is formed in the transparent connector 192 above the data line layer signal line 410, and the contact hole 183a is formed in the transparent connector 192 above the gate line layer signal line 420. However, alternative exemplary embodiments include configurations wherein the gate driver 400 may not be formed on the first display panel 100, but may be formed as an additional integrated circuit ("IC") chip, and the contact holes 183a and 183b for the connector of the transparent connector 192 and the signal lines 410 or 420 may be omitted.

A light blocking assistance member 321 is formed on the transparent connector 192 of the peripheral area PA of the LCD. The light blocking assistance member 321 may be simultaneously formed with the spacer 320 by using the same photosensitive material as used to form the spacer 320. Here, a half-tone mask may be used to form the assistance spacer 320a and the light blocking assistance member 321, and the photosensitive material may be a positive or negative photosensitive material. In the exemplary embodiment where it is used, the half-tone mask includes a transmitting region where substantially all the light is transmitted, a light blocking region where substantially all the light is blocked, and a translucent region where only a portion of the light is transmitted.

In one exemplary embodiment, the translucent region may include several slits which are closely disposed, or a thin metal layer to control the exposure amount. In such an exemplary embodiment, the number of slits, the width thereof, or the thickness of the metal layer is used to control the exposure amount.

When forming the light blocking assistance member 321 and the spacer 320 by using the positive photosensitive material, the portion where the spacer 320 is formed is disposed corresponding to the light blocking region, the portion where the light blocking assistance member 321 is formed is disposed corresponding to the translucent region, and the portion where the positive photosensitive material is substantially all removed is disposed corresponding to the transmitting region. When forming the light blocking assistance member 321 and the spacer using the negative photosensitive material, the portion where the spacer is formed is disposed corresponding to the transmitting region, the portion where the light blocking assistance member 321 is formed is disposed corresponding to the translucent region, and the portion where the positive photosensitive material is substantially all removed is disposed corresponding to the light blocking region.

Like the spacer 320, the light blocking assistance member 321 may be colored, and covers substantially the whole peripheral area PA. Accordingly, the light blocking assistance member 321 prevents light leakage that is generated due to the thin thickness of the light blocking member 220 and the reflection of the external light generated by the contact hole 183a and 183b in the peripheral area PA such that the display quality of the LCD is improved.

However, in the exemplary embodiment wherein the assistance spacer 320a of FIG. 3A is omitted, the light blocking assistance member 321 covering the peripheral area PA does not include the protrusion of the assistance spacer 320a, and the exposure amount of the mask may be controlled to control the total thickness of the light blocking assistance member 321. For example, if the negative photosensitive film is used, and the exposure amount of the peripheral area PA is increased by increasing the width of the slits, and the thickness of the light blocking assistance member 321 is increased. In contrast, if the width of the slits is narrow, the thickness of the light blocking assistance member 321 is relatively decreased. The light leakage is further prevented according to the increasing of the thickness of the light blocking assistance member 321. Also, exemplary embodiments include configurations wherein the half-tone mask may not be used, and the light blocking assistance member 321 and the spacer 320 may be formed with substantially the same height.

Further, in one exemplary embodiment, the light blocking member 220 as well as the light blocking assistance member 321 may only be formed inside the sealant 310, and a bezel (not shown) may cover the portion inside the sealant 310 in this case.

Next, the second display panel 200 will be described. The common electrode 270 is formed on the second substrate 210, exemplary embodiments of which may be made of a material such as transparent glass or plastic or other materials having similar characteristics, similar to the first substrate 110. Exemplary embodiments of the common electrode 270 may be made of a transparent conductor such as ITO or IZO, and may be applied with a common voltage. Exemplary embodiments include configurations wherein an alignment layer may be formed on the common electrode 270.

Figure 3B:
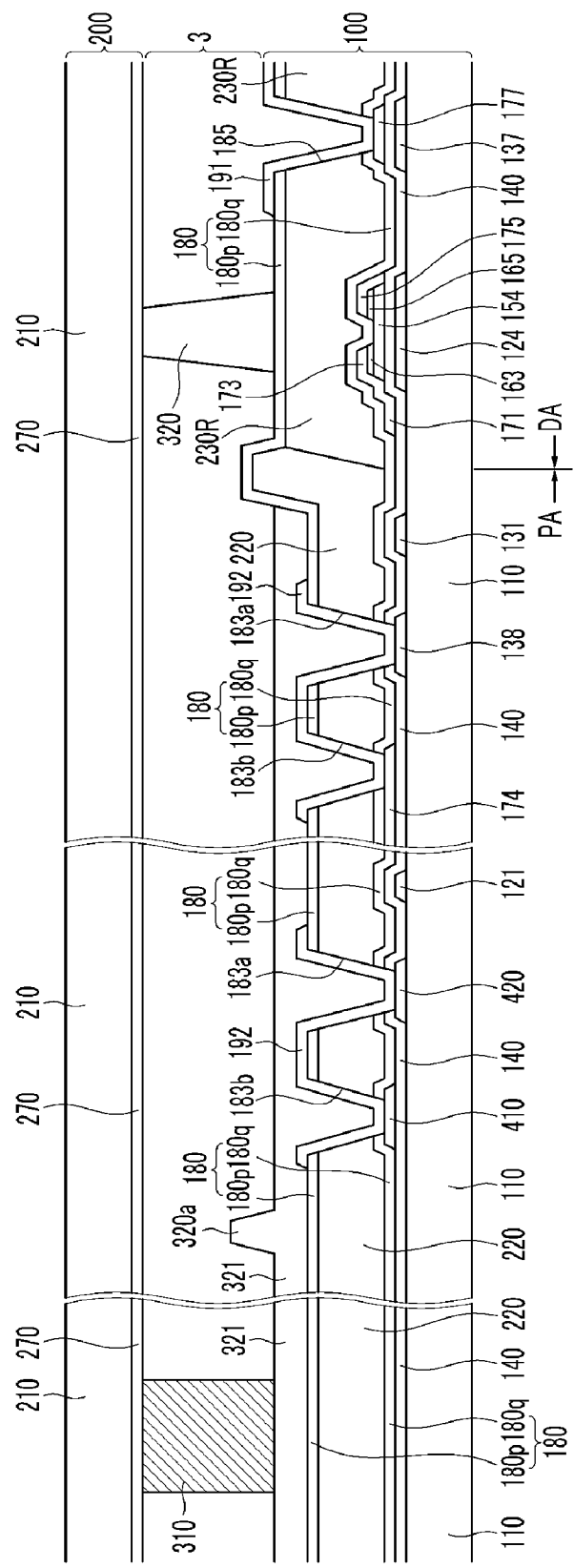

FIG. 3B is a cross-sectional views showing the A region of another exemplary embodiment of an LCD according to the present invention taken along line III-III of FIG. 2.

The exemplary embodiment of FIG. 3B is similar to the above-described exemplary embodiment of FIG. 3A, except for light blocking assistance members 321 formed inside and outside of the sealant 310. In such an exemplary embodiment, the light blocking member 220 may also be formed outside of the sealant 310, and the bezel may cover the portion outside of the sealant 310. The exemplary embodiment of FIG. 3B has the advantage that the sealant 310 may be formed with a wide area in the process for forming the sealant 310 compared with the exemplary embodiment of FIG. 3A. In the exemplary embodiment of FIG. 3B, the light blocking assistance member 321 and the light blocking member 220 are formed inside and outside of the sealant 310 such that the portion where the step is generated may be omitted. Accordingly, the region where the sealant 310 will be formed is wide. Similar to the exemplary embodiment of FIG. 3A, the light leakage due to the light blocking member 220 and the reflection of the external light by the contact holes 183a and 183b are prevented. Also, similar to the exemplary embodiment of FIG. 3A, variations of the present exemplary embodiment include configurations wherein the assistance spacer 320a may be omitted.

Figure 3C:
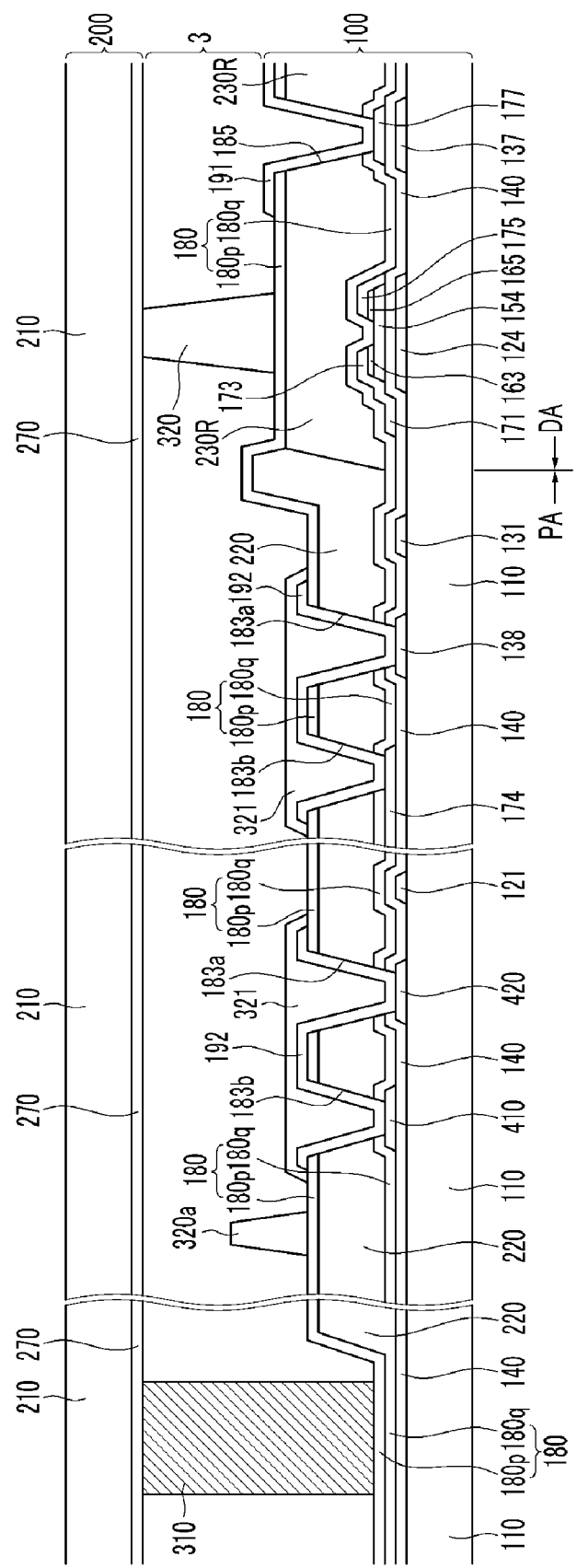

FIG. 3C is a cross-sectional view showing the A region of another exemplary embodiment of the LCD according to the present invention taken along line III-III of FIG. 2.

The exemplary embodiment of FIG. 3C is similar to the above-described exemplary embodiment of FIG. 3A except for light blocking assistance members 321 only covering contact holes 183a and 183b of the peripheral area PA where the reflection by the external light is largely generated. In the exemplary embodiment of FIG. 3C, the light blocking assistance member 321 is formed only on the contact holes 183a and 183b such that the translucent region (slit region) of the mask used in its formation is smaller than the exemplary embodiment of FIG. 3A. Accordingly, the light blocking assistance member 321 formed through the halftone exposure process has a large margin of thickness uniformity such that the process for forming the light blocking assistance member 321 and the spacer is easier. Also, the process for forming the light blocking assistance member 321 and the spacer with the same height without the use of the half-tone is increased. Also, like the exemplary embodiment of FIG. 3A, variations on the present exemplary embodiment include configurations wherein the assistance spacer 320a may be omitted.

Figure 3D:
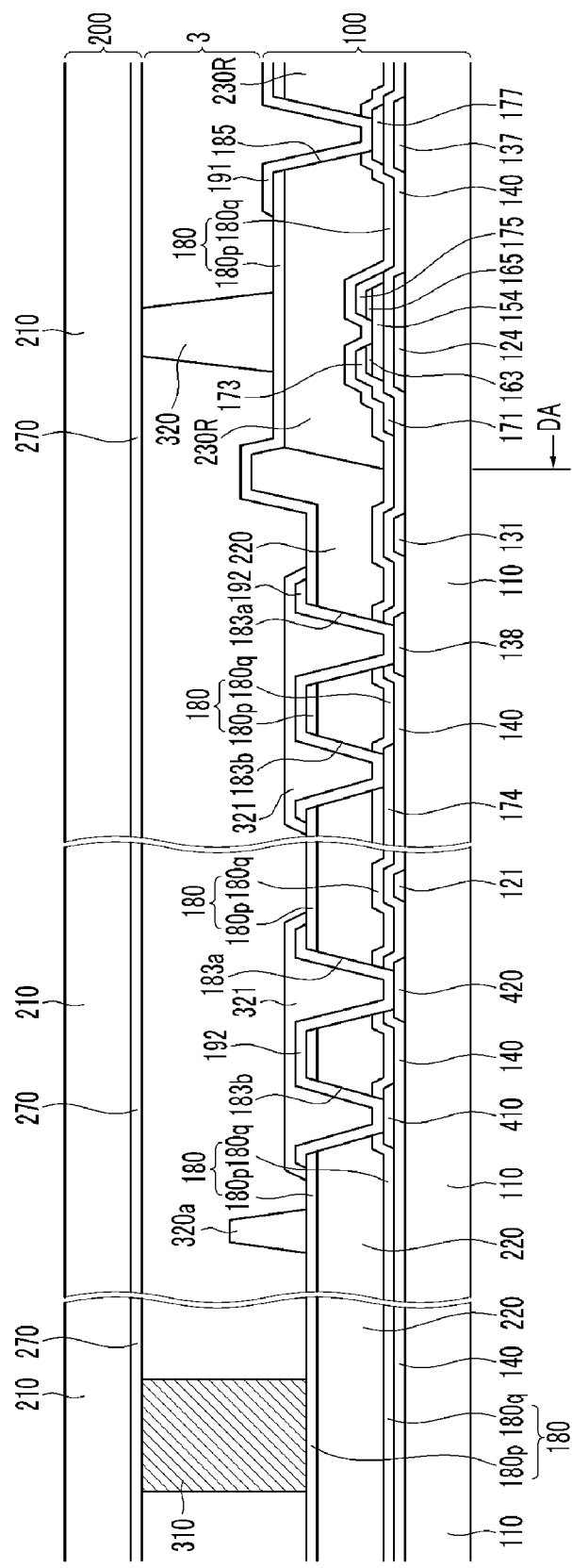

FIG. 3D is a cross-sectional view showing the A region of another exemplary embodiment of the LCD according to the present invention taken along line III-III of FIG. 2.

The exemplary embodiment of FIG. 3D is similar to the exemplary embodiment of FIG. 3C except the light blocking assistance member 321 is formed inside and outside of the sealant 310. Accordingly, the merits of the exemplary embodiment of FIG. 3C also apply to the present exemplary embodiment. Furthermore, the position for forming the sealant 310 is wide compared with the exemplary embodiment of FIG. 3C. Also, like the exemplary embodiment of FIG. 3A, variations on the present exemplary embodiment include configurations wherein the assistance spacer 320a may be omitted.

Figure 3E:
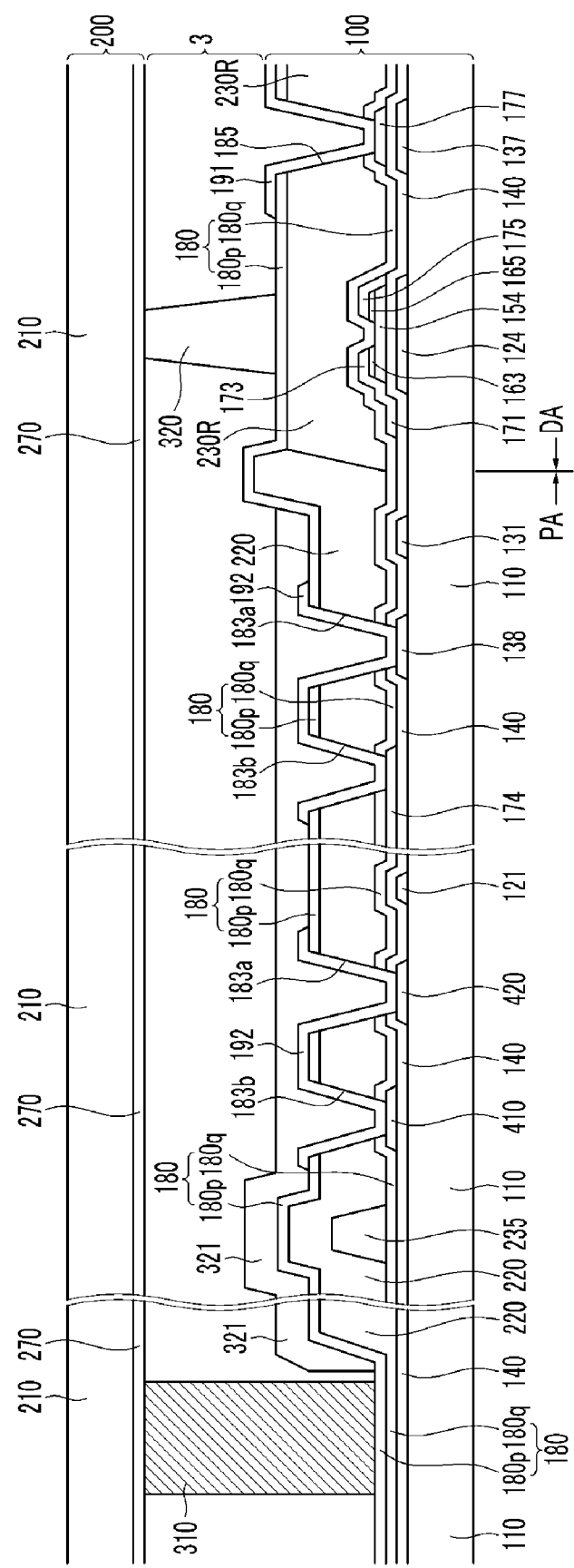

FIG. 3E is a cross-sectional view showing the A region of another exemplary embodiment of the LCD according to the present invention taken along line III-III of FIG. 2.

The exemplary embodiment of FIG. 3E is similar to the exemplary embodiment of FIG. 3A except for the fact that an outer protruding member 235, which is formed with substantially the same material as the color filter 230R, is formed on the lower passivation layer 180q. In the present exemplary embodiment, the light blocking assistance member 321 climbs the outer protruding member 235 and functions similar to the assistance spacer 320a. Accordingly, the benefits of the exemplary embodiment of FIG. 3A are applicable to the present exemplary embodiment. Furthermore, in the exemplary embodiment of FIG. 3E, the light blocking assistance member 321 is formed with substantially the same thickness in the whole peripheral area PA. Also, the light blocking assistance member 321 and the spacer 320 may be formed to have substantially the same height without the use of the half-tone mask.

Figure 3F:
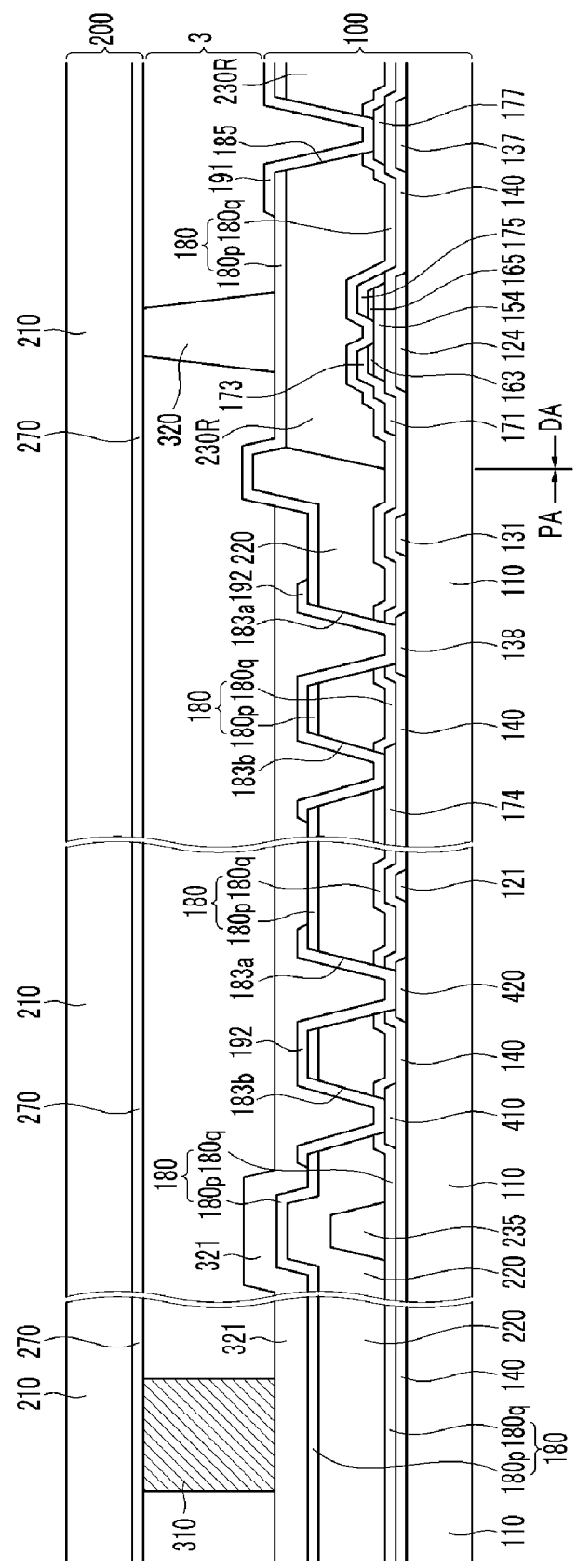

FIG. 3F is a cross-sectional view showing the A region of another exemplary embodiment of the LCD according to the present invention taken along line III-III of FIG. 2.

The exemplary embodiment of FIG. 3F is similar to the exemplary embodiment of FIG. 3E except that the light blocking assistance member 321 has the same height inside and outside of the sealant 310, while still forming the light blocking assistance member 321 over the outer protruding member 235. Accordingly, the benefits of the exemplary embodiment of FIG. 3E are applied. Furthermore, there is a benefit that the position for forming the sealant 310 is wide.

Figure 4:
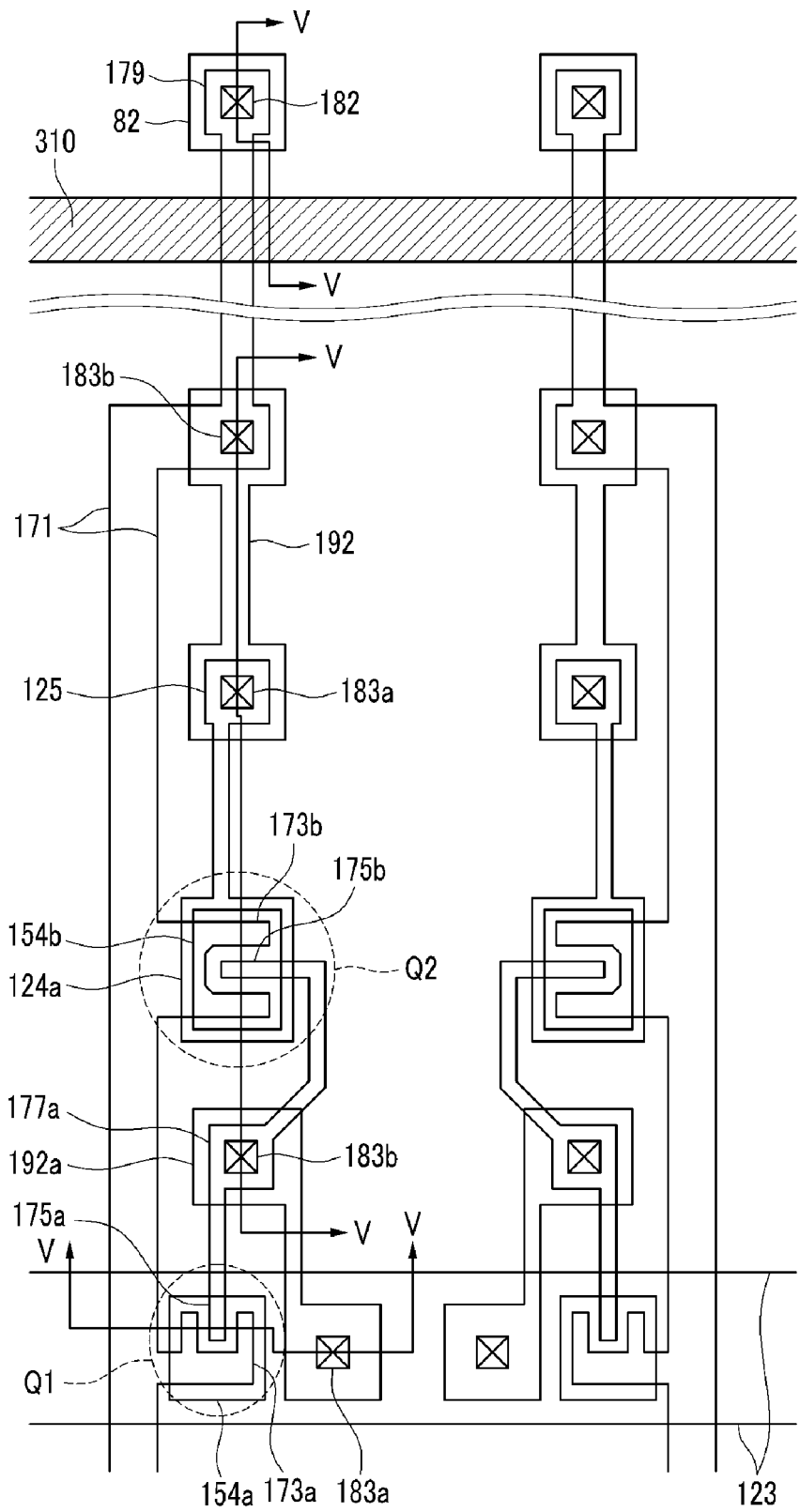
FIG. 4 is a top plan layout view of a B region shown in FIG. 1.
Figure 5:
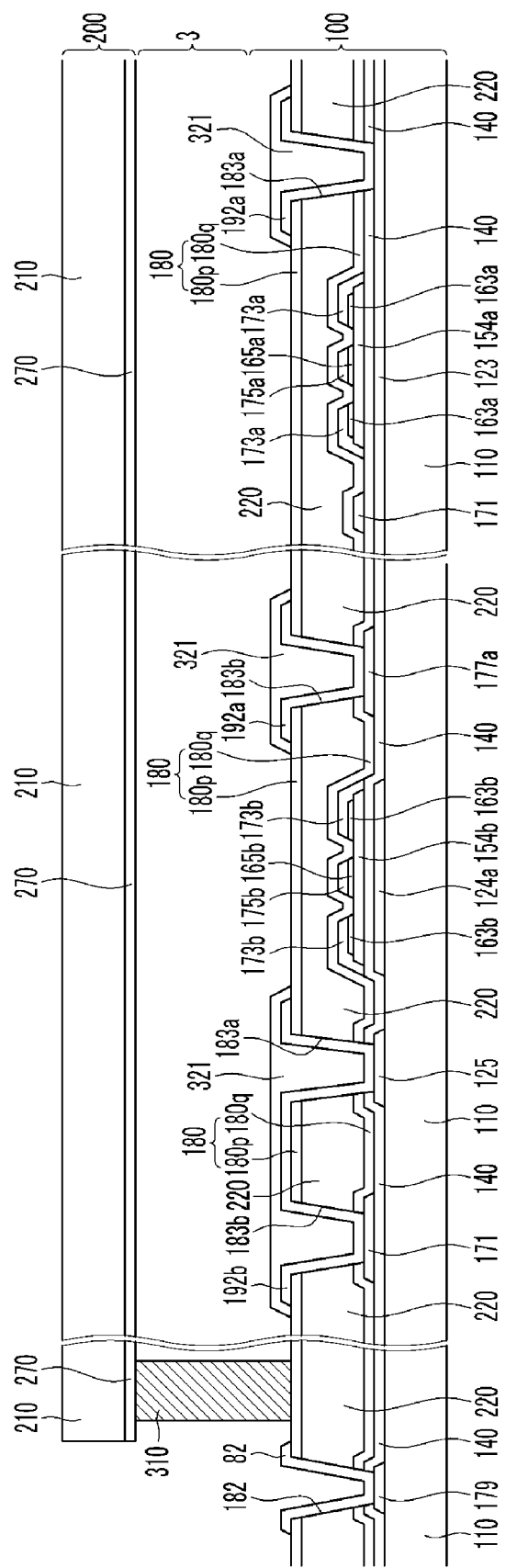
FIG. 5 is a cross-sectional view of the exemplary embodiment of an LCD shown in FIG. 4 taken along line V-V.

FIG. 4 is a top plan layout view of a B region shown in FIG. 1, and FIG. 5 is a cross-sectional view of the exemplary embodiment of an LCD shown in FIG. 4 taken along line V-V.

As shown in FIG. 4 and FIG. 5, a first TFT Q1 and a second TFT Q2 are formed on an upper portion and a lower portion of the peripheral area PA of the LCD, and they are connected to the data line 171 and a shorting line 123 to discharge static electricity generated in the display panel 100 into the whole of the display panel 100 such that the static electricity is prevented from damaging elements such as a TFT. However, alternative exemplary embodiments include configurations wherein the first TFT Q1 and the second TFT Q2 may be omitted.

The first TFT Q1 includes the shorting line 123 formed from substantially the same layer as the gate line 121, a first semiconductor 154a formed on the gate insulating layer 140, a first source electrode 173a formed on the first semiconductor 154a, a first drain electrode 175a facing the first source electrode 173a on the first semiconductor 154a, and a first transparent connector 192a electrically connecting the shorting line 123 and the first drain electrode 175a to each other. Here, the shorting line 123 and the first drain electrode 175a both directly contact the first transparent connector 192a, and the contact holes 183a and 183b are disposed in the contact portion.

The second TFT Q2 includes an expansion 125 of the gate electrode formed from substantially the same layer as the gate line 121, a second semiconductor 154b formed on the gate insulating layer 140, a second source electrode 173b formed on the second semiconductor 154b, a second drain electrode 175b facing the second source electrode 173b on the second semiconductor 154b, and a second transparent connector 192b electrically connecting the expansion 125 of the gate electrode and the data line 171 to each other. Here, the expansion 125 of the gate electrode and the data line 171 both directly contact the second transparent connector 192b, and the contact holes 183a and 183b are disposed in the contact portion.

In the present exemplary embodiment, contact assistants 82 are connected to end portions 179 of the data lines 171 through contact holes 182. The contact assistants 82 complement adhesion of the end portions 179 of the data lines 171 with an external device such as a driver IC, and protect them. Alternative exemplary embodiments include configurations wherein the data lines 171 may be directly contacted to the data driver 500, there in such exemplary embodiments the contact assistants 82 may be omitted.

In the exemplary embodiment of FIG. 5, the light blocking assistance member 321 is formed only in the contact holes 183a, 183b, and 182. Furthermore, the exemplary embodiments of FIG. 3A to FIG. 3F may be similarly applied to the area B of FIG. 1, and the various alternative configurations of the exemplary embodiments of FIG. 3A to FIG. 3D in which the assistance spacer 320a is omitted may be similarly applied.

An exemplary embodiment of a manufacturing method of an exemplary embodiment of an LCD according to the present invention will now be described.

Firstly, the gate line 121 and the storage electrode line 131 are formed in the display area DA on the first substrate, and the gate line layer signal line 420 of the gate driver is formed in the peripheral area PA. Next, the gate insulating layer 140 is formed.

The data line 171 is formed on the gate insulating layer 140 in the display area DA, and the storage voltage supplying line 174 and the data line layer signal line 410 of the gate driver is formed in the peripheral area PA. Next, the lower layer 180q is formed. Furthermore, before forming the lower layer 180q, a TFT connected to the display area signal line DA may be formed. In this case, the lower layer 180q is formed on the TFT.

The light blocking member 220 is formed on the lower layer 180q, and the upper layer 180p is formed on the light blocking member 220. Also, the pixel electrode 191 is formed on the upper layer 180p, and simultaneously the transparent connector 192 for connecting signal lines of the peripheral area PA to each other through the contact holes 183a and 183b passing though the light blocking member 220 is formed on the light blocking member 220.

Exemplary embodiments include configurations wherein the color filter 230R may be formed on the lower layer 180q. In such exemplary embodiments, the upper layer 180q is formed on the color filter 230R, and the pixel electrode 192 is formed on the upper layer 180p.

The assistance spacer 320a, and the light blocking assistance member 321 are simultaneously formed on the transparent connector 192 and the spacer 320 may be formed on the upper layer 180p of the passivation layer. Here, the exposure amount is controlled by the half-tone mask to control the thicknesses of the formation of the spacer 320, the assistance spacer 320a, and the light blocking assistance member 321. Also, the light blocking assistance member 321 may only cover the contact holes 183a and 183b, or the whole peripheral area PA, as described above in the various exemplary embodiments shown in FIGS. 3A-F.

The liquid crystal layer 3 is formed on the spacer, the assistance spacer 320a, and the light blocking assistance member 321.

Next, the common electrode 270 is formed on the second substrate 210.

Next, the second substrate 210 is aligned for the liquid crystal layer 3 to be contacted with the common electrode 270 of the second substrate 210, and the first substrate 110 and the second substrate 210 are combined.

However, alternative exemplary embodiments include configurations wherein when forming the liquid crystal layer 3 on the common electrode 270 of the second substrate 210, the second substrate 210 may be aligned for the liquid crystal layer 3 to be contacted with the spacer, the assistance spacer 320a, and the light blocking assistance member 321 formed on the first substrate 110, after the first substrate 110 and the second substrate 210 are combined.

The various components of the TFT may be formed through the general thin film formation method such as patterning of a thin film deposition, and photolithography and other similar methods.

While this invention has been described in connector with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A thin film transistor array panel comprising:
   a substrate including a display area and a peripheral area;
   a display area signal line disposed in the display area;
   a display area thin film transistor disposed in the display area, the display area thin film transistor connected to the display area signal line;
   a plurality of peripheral area signal lines disposed in the peripheral area;
   a light blocking member disposed on the display area signal line, the display area thin film transistor, and the plurality of peripheral area signal lines;
   a transparent connector electrically connecting at least one of the plurality of peripheral area signal lines and another one of the plurality of peripheral area signal lines through at least one contact hole passing through the light blocking member;
   a pixel electrode connected to the display area thin film transistor;
   a colored spacer disposed on the light blocking member; and
   a light blocking assistance member comprising the same material as the spacer on the transparent connector, the light blocking assistance member covering at least the at least one contact hole.

2. The thin film transistor array panel of claim 1, further comprising an assistance spacer disposed in the peripheral area.

3. The thin film transistor array panel of claim 1, further comprising an outer protruding member disposed between the substrate in the peripheral area and the light blocking member in the peripheral area.

4. The thin film transistor array panel of claim 1, further comprising:
   a peripheral area thin film transistor disposed in the peripheral area,
   wherein the at least one contact hole includes a contact hole electrically connecting the peripheral area thin film transistor and at least one of the plurality of peripheral area signal lines to each other.

5. The thin film transistor array panel of claim 1, wherein the plurality of peripheral area signal lines include:
   a storage electrode line disposed on the substrate; and
   a storage voltage supplying line disposed on the storage electrode line,
   wherein the at least one contact hole includes a contact hole connecting the storage electrode line and the storage voltage supplying line to each other.

6. The thin film transistor array panel of claim 5, wherein the plurality of peripheral area signal lines includes: a gate line layer signal line of the gate driver disposed on the substrate; and
   a data line layer signal line of the gate driver,
   wherein the at least one contact hole includes a contact hole connecting the gate line layer signal line of the gate driver and the data line layer signal line of the gate driver.

7. The thin film transistor array panel of claim 1, further comprising a color filter disposed on the substrate.

8. The thin film transistor array panel of claim 7, further comprising an assistance spacer disposed in the peripheral area.

9. The thin film transistor array panel of claim 7, further comprising an outer protruding member comprising the same material as the color filter disposed between the substrate in the peripheral area and the light blocking member in the peripheral area.

10. The thin film transistor array panel of claim 7, further comprising:
    a peripheral area thin film transistor disposed in the peripheral area of the substrate,
    wherein the at least one contact hole includes a contact hole electrically connecting the peripheral area thin film transistor and at least one of the plurality of peripheral area signal lines to each other.

11. The thin film transistor array panel of claim 7, wherein the plurality of peripheral area signal lines includes:
    a storage electrode line disposed on the substrate; and
    a storage voltage supplying line disposed on the storage electrode line,
    wherein the at least one contact hole includes a contact hole connecting the storage electrode line and the storage voltage supplying line to each other.

12. The thin film transistor array panel of claim 11, wherein the plurality of peripheral area signal lines includes:
    a gate line layer signal line of the gate driver disposed on the substrate; and
    a data line layer signal line of the gate driver,
    wherein the at least one contact hole includes a contact hole connecting the gate line layer signal line of the gate driver and the data line layer signal line of the gate driver.

13. A liquid crystal display comprising:
    a first display panel including:
      a first substrate including a display area and a peripheral area;
      a plurality of peripheral area signal lines disposed in the peripheral area;
      a light blocking member disposed on the plurality of peripheral area signal lines;
      a pixel electrode disposed on the light blocking member;
      a transparent connector electrically connecting at least one of the plurality of peripheral area signal lines and another one of the plurality of peripheral area signal lines through at least one contact hole passing through the light blocking member;

a colored spacer disposed on the light blocking member; and a light blocking assistance member comprising the same material as the spacer on the transparent connector, the light blocking assistance member covering at least the at least one contact hole;

a second display panel including:
a second substrate facing the first substrate; and
a common electrode disposed on the second substrate; and a liquid crystal layer disposed between the first display panel and the second display panel.

14. The liquid crystal display of claim 13, further comprising:
a display area signal line disposed in the display area; and
a display area thin film transistor disposed in the display area, the display area thin film transistor connected to the display area signal line,
wherein the pixel electrode is connected to the display area thin film transistor.

15. The liquid crystal display of claim 14, wherein the peripheral area includes an assistance spacer.

16. The liquid crystal display of claim 14, further comprising:
a peripheral area thin film transistor disposed in the peripheral area,
wherein the at least one contact hole includes a contact hole connecting the peripheral area thin film transistor and the peripheral area signal line to each other.

17. The liquid crystal display of claim 14, wherein the peripheral area signal line includes:
a storage electrode line disposed on the substrate; and
a storage voltage supplying line disposed on the storage electrode line,
wherein the at least one contact hole includes a contact hole connecting the storage electrode line and the storage voltage supplying line.

18. The liquid crystal display of claim 14, wherein the peripheral area signal line includes:
a gate line layer signal line of the gate driver disposed on the substrate; and
a data line layer signal line of the gate driver,
wherein the at least one contact hole includes a contact hole connecting the gate line layer signal line of the gate driver and the data line layer signal line of the gate driver.

19. The liquid crystal display of claim 18, further comprising an outer protruding member disposed between the substrate in the peripheral area and the light blocking member in the peripheral area.

20. The liquid crystal display of claim 14, further comprising a color filter disposed on the substrate.

21. The liquid crystal display of claim 20, further comprising an assistance spacer disposed in the peripheral area.

22. The liquid crystal display of claim 20, further comprising an outer protruding member comprising the same material as the color filter and disposed between the substrate of the peripheral area and the light blocking member of the peripheral area.

23. The liquid crystal display of claim 20, comprising:
a peripheral area thin film transistor disposed in the peripheral area,
wherein the at least one contact hole includes a contact hole connecting the peripheral area thin film transistor and the peripheral area signal line to each other.

24. The liquid crystal display of claim 20, wherein the plurality of peripheral area signal lines includes:
a storage electrode line disposed on the substrate; and
a storage voltage supplying line disposed on the storage electrode line,
wherein the at least one contact hole includes a contact hole connecting the storage electrode line and the storage voltage supplying line.

25. The liquid crystal display of claim 24, wherein the plurality of peripheral area signal lines includes:
a gate line layer signal line of the gate driver disposed on the substrate, and
a data line layer signal line of the gate driver,
wherein the at least one contact hole includes a contact hole connecting the gate line layer signal line of the gate driver and the data line layer signal line of the gate driver.

26. A method for manufacturing a liquid crystal display, comprising:
forming a display area signal line and a plurality of peripheral area signal lines on a first substrate;
forming a light blocking member on the plurality of peripheral area signal lines;
forming a pixel electrode on the display area signal line;
forming a transparent connector on the light blocking member connecting at least one of the plurality of peripheral area signal lines to another of the plurality of peripheral area signal lines through at least one contact hole passing through the light blocking member; and
forming a colored spacer on the light blocking member and a colored light blocking assistance member on the transparent connector substantially simultaneously,
wherein the light blocking assistance member covers at least the at least one contact hole and comprises substantially the same material as the spacer.

27. The method of claim 26, wherein, in the forming of the light blocking assistance member, an assistance spacer is formed using a half-tone mask.

28. The method of claim 26, further comprising forming a color filter between the display area signal line and the pixel electrode.

29. The method of claim 28, wherein, in the forming of the color filter, an outer protruding member is formed comprising the same material as the color filter and is disposed at substantially the same time as the color filter.

30. The method of claim 26, further comprising connecting a thin film transistor to the display area signal line.

31. The method of claim 26, further comprising:
forming a liquid crystal layer on the light blocking assistance member; and
combining a second substrate comprising a common electrode to the first substrate.

* * * * *